(12) United States Patent
Park

(10) Patent No.: US 12,459,233 B2
(45) Date of Patent: Nov. 4, 2025

(54) CUSHION PLATE, DISPLAY APPARATUS INCLUDING THE SAME, AND METHOD FOR MANUFACTURING THE CUSHION PLATE

(71) Applicant: LG DISPLAY CO., LTD., Seoul (KR)

(72) Inventor: Chanhyeok Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 372 days.

(21) Appl. No.: 17/992,456

(22) Filed: Nov. 22, 2022

(65) Prior Publication Data

US 2023/0205278 A1   Jun. 29, 2023

(30) Foreign Application Priority Data

Dec. 24, 2021   (KR) .......................... 10-2021-0187795

(51) Int. Cl.
*B32B 15/20* (2006.01)
*B32B 15/04* (2006.01)

(52) U.S. Cl.
CPC ............ *B32B 15/20* (2013.01); *B32B 15/046* (2013.01); *B32B 2266/045* (2013.01)

(58) Field of Classification Search
CPC .. B32B 15/20; B32B 15/046; B32B 2266/045
USPC ........................................................ 428/192
See application file for complete search history.

(56) References Cited

U.S. PATENT DOCUMENTS

| 6,620,544 | B1 | 9/2003 | Shin et al. |
| 9,798,414 | B2 | 10/2017 | Kim et al. |
| 10,379,392 | B2 | 8/2019 | Noguchi et al. |
| 11,355,413 | B2 | 6/2022 | Lee et al. |
| 11,805,609 | B2 * | 10/2023 | Park ........................ G06F 1/203 |
| 12,183,653 | B2 | 12/2024 | Lee et al. |
| 12,262,485 | B2 * | 3/2025 | Park .................... B32B 38/0004 |
| 2014/0183473 | A1 | 7/2014 | Lee et al. |
| 2017/0123461 | A1 | 5/2017 | Kim et al. |
| 2017/0210090 | A1 | 7/2017 | Kim et al. |
| 2018/0059480 | A1 | 3/2018 | Noguchi et al. |
| 2019/0131362 | A1 * | 5/2019 | Lee ..................... H10K 59/873 |
| 2021/0104694 | A1 | 4/2021 | Yee |

(Continued)

FOREIGN PATENT DOCUMENTS

| CN | 105302372 A | 2/2016 |
| CN | 105938405 A | 9/2016 |
| CN | 109860240 A | 6/2019 |

(Continued)

OTHER PUBLICATIONS

Extended European Search Report issued in corresponding European Patent Application No. 22206782.9, dated Apr. 24, 2023.

(Continued)

*Primary Examiner* — Betelhem Shewareged
(74) *Attorney, Agent, or Firm* — Morgan, Lewis & Bockius LLP

(57) ABSTRACT

A display apparatus includes a display panel to display an image and a cushion plate disposed under the display panel. The cushion plate has an adhesive member and a porous member including a body portion area and a side portion area disposed along a side face of the body portion area. A thickness of the side portion area is smaller than a thickness of the body portion area. A porosity of the side portion area is lower than a porosity of the body portion area.

15 Claims, 11 Drawing Sheets

(56) References Cited

U.S. PATENT DOCUMENTS

| | | | |
|---|---|---|---|
| 2021/0259143 A1 | 8/2021 | Shin et al. | |
| 2023/0205278 A1* | 6/2023 | Park | G06F 1/1656 361/679.01 |

FOREIGN PATENT DOCUMENTS

| | | |
|---|---|---|
| EP | 1052715 A1 | 11/2000 |
| JP | 60-159136 A | 8/1985 |
| JP | 2001-135301 A | 5/2001 |
| JP | 2002-254253 A | 9/2002 |
| JP | 2003-109625 A | 4/2003 |
| JP | 2007-248820 A | 9/2007 |
| JP | 2012-114224 A | 6/2012 |
| JP | 2012-124391 A | 6/2012 |
| JP | 2012-162756 A | 8/2012 |
| JP | 2014-006963 A | 1/2014 |
| JP | 2016-186902 A | 10/2016 |
| JP | 2018-008419 A | 1/2018 |
| JP | 2018-036506 A | 3/2018 |
| JP | 2018-037485 A | 3/2018 |
| JP | 2018-170297 A | 11/2018 |
| KR | 10-2014-0063082 A | 5/2014 |
| KR | 10-2020-0002687 A | 1/2020 |
| KR | 10-2020-0037712 A | 4/2020 |
| KR | 10-2020-0083697 A | 7/2020 |
| KR | 10-2020-0129646 A | 11/2020 |

OTHER PUBLICATIONS

Office Action issued on Dec. 12, 2023 in Japanese Patent Application No. 2022-207346.

Office Action issued on Dec. 8, 2024 in Korean Patent Application No. 10-2021-0187795 with English translation.

Office Action issued on May 24, 2025 in Chinese Patent Application No. 202211605280.X with English translation.

* cited by examiner 321 323
‾‾‾
320

300

310
325

323 321
‾‾‾
320

320b  320a  320b $W_3$
$W_2$

CUSHION PLATE, DISPLAY APPARATUS INCLUDING THE SAME, AND METHOD FOR MANUFACTURING THE CUSHION PLATE

CROSS-REFERENCE TO RELATED APPLICATION

This application claims the benefit of and the priority to Korean Patent Application No. 10-2021-0187795 filed on Dec. 24, 2021, which is hereby incorporated by reference in its entirety.

BACKGROUND

1. Technical Field

The present disclosure relates to a cushion plate with improved stiffness and a reduced thickness, a method for manufacturing the cushion plate, and a display apparatus including the cushion plate.

2. Description of the Related Art

Display apparatuses include a variety of forms, such as televisions, monitors, smart phones, tablet PCs, laptops, and wearable devices.

In general, a display apparatus includes a display area for displaying a screen and a non-display area formed along an outer edge of the display area.

In the display apparatus, the non-display area is also referred to as a bezel area. When the bezel area is thick, the user's gaze is dispersed. When the bezel area is thin, the user's gaze may be fixed on the screen of the display area. Thus, the user's immersion experience may be improved.

In other words, when the bezel area becomes thinner, an overall size of the display apparatus may be reduced while enhancing the user's immersion experience. Thus, demand from consumers for a display apparatus having the reduced bezel area as much as possible is increasing.

SUMMARY

As users' demand for a portable display apparatus increases, the demand for development of a slimmer display apparatus with strong stiffness is also increasing.

There are several ways to test the stiffness of the display apparatus.

As an example, the push stiffness may be an important factor when a continuous pressure is applied to the display apparatus upon touch or under a gripping force. A typical test for push stiffness may include measuring the continuous pressure, such as a force that presses the display apparatus persistently.

The impact stiffness is an important factor when the display apparatus is dropped from a high place or an instantaneous impact is applied thereto. Instantaneous impact stiffness may be measured through a ball-drop test in which an iron ball is freely dropped from a predetermined height onto the display apparatus.

Further, the impact is often concentrated on a side edge portion surrounding an inner region of the display apparatus. Thus, the stiffness of the inner region of the display apparatus is important. Further, the stiffness of the side edge portion surrounding the inner region may be important.

Accordingly, the inventors of the present disclosure have invented a cushion plate with improved stiffness not only in the inner region but also in the side edge portion thereof while having a reduced thickness, a method for manufacturing the cushion plate, and a display apparatus including the cushion plate.

An object according to one aspect of the present disclosure is to provide a cushion plate having improved impact stiffness, and a display apparatus including the cushion plate.

An object according to one aspect of the present disclosure is to provide a cushion plate with improved push stiffness in the inner region as well as the side edge portion thereof while having a reduced thickness, and a display apparatus including the cushion plate.

An object according to one aspect of the present disclosure is to provide a method for manufacturing a cushion plate having improved impact stiffness and push stiffness, and having a reduced thickness.

Objects of the present disclosure are not limited to the above-mentioned objects. Other objects and advantages of the present disclosure that are not mentioned may be understood based on following descriptions, and may be more clearly understood based on aspects of the present disclosure. Further, it will be easily understood that the objects and advantages of the present disclosure may be realized using means shown in the claims and combinations thereof.

To achieve these and other advantages and in accordance with objects of the disclosure, as embodied and broadly described herein, a display apparatus includes a display panel to display an image, and a cushion plate disposed under the display panel, the cushion plate having an adhesive member, and a porous member including a body portion area and a side portion area disposed along a side face of the body portion area, where a thickness of the side portion area is smaller than a thickness of the body portion area, and where a porosity of the side portion area is lower than a porosity of the body portion area.

In another aspect of the present disclosure, a cushion plate includes an adhesive member, and a porous member disposed on the adhesive member, the porous member including a conductive metal and a plurality of pores disposed inside the conductive metal, and having a body portion area and a side portion area disposed along a side face of the body portion area, where a thickness of the side portion area is smaller than a thickness of the body portion area, and where a porosity of the side portion area is lower than a porosity of the body portion area.

In yet another aspect of the present disclosure, a method for manufacturing a cushion plate, the method including forming a porous member including a conductive metal, and a plurality of pores disposed inside the conductive metal, first compressing the porous member to form a first compressed porous member, and second compressing the first compressed porous member while laminating the first compressed porous member to an adhesive member.

According to an example embodiment of the present disclosure, the porous member included in the cushion plate may include the conductive metal and the plurality of pores disposed inside the conductive metal, such that the impact stiffness of each of the cushion plate and the display apparatus including the cushion plate may be improved.

Further, according to an example embodiment of the present disclosure, the thickness of the side portion area of the porous member included in the cushion plate may be smaller than the thickness of the body portion area, and the porosity of the side portion area may be lower than the porosity of the body portion area. Thus, the cushion plate may have a reduced thickness, and at the same time, improved push stiffness in not only the inner region but also the side edge portion thereof.

Further, according to an example embodiment of the present disclosure, after the porous member is first compressed, the porosity of the first compressed porous member can be reduced by a second compression while laminating the first compressed porous member to the adhesive member. Thus, the cushion plate having improved impact stiffness and push stiffness and at the same time, having a slimmer thickness may be manufactured.

Effects of the present disclosure are not limited to the above-mentioned effects, and other effects not mentioned will be clearly understood by those skilled in the art from following descriptions.

It is to be understood that both the foregoing general description and the following detailed description of the present disclosure are merely by way of example and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1A:
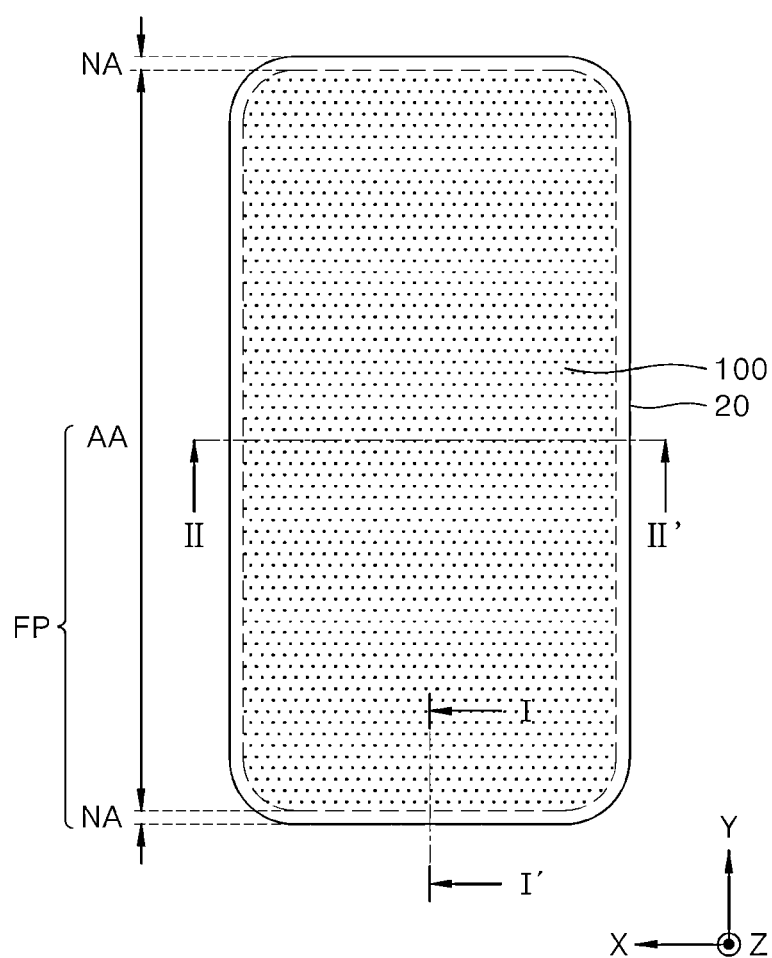
FIG. 1A and FIG. 1C illustrate front and back faces, respectively, of a display apparatus according to an example embodiment of the present disclosure.

Reference will now be made in detail to some of the examples and embodiments of the disclosure illustrated in the accompanying drawings. Wherever possible, the same reference numbers will be used throughout the drawings to refer to the same or like parts.

Advantages and features of the present disclosure, and a method of achieving the advantages and features will become apparent with reference to the example embodiments described herein in detail together with the accompanying drawings. The present disclosure should not be construed as limited to the example embodiments as disclosed below, and may be embodied in various different forms. Thus, these example embodiments are set forth only to make the present disclosure sufficiently complete, and to assist those skilled in the art to fully understand the scope of the present disclosure. The protected scope of the present disclosure is defined by claims and their equivalents.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. The same or similar elements are designated by the same reference numerals throughout the specification unless otherwise specified. Further, where the detailed description of the relevant known steps and elements may unnecessarily obscure an important point of the present disclosure, a detailed description of such known steps and elements may be omitted. Furthermore, in the following detailed description of the present disclosure, numerous specific details are set forth in order to provide a sufficiently thorough understanding of the present disclosure. However, it will be understood that the present disclosure may be practiced without these specific details. In other instances, known methods, procedures, components, and circuits have not been described in detail so as not to unnecessarily obscure aspects of the present disclosure.

The terminology used herein is to describe particular aspects and is not intended to limit the present disclosure. As used herein, the terms "a" and "an" used to describe an element in the singular form is intended to include a plurality of elements. An element described in the singular form is intended to include a plurality of elements, and vice versa, unless the context clearly indicates otherwise.

In the present specification, where the terms "comprise," "have," "include," and the like are used, one or more other elements may be added unless the term, such as "only," is used. As used herein, the term "and/or" includes a single associated listed item and any and all of the combinations of two or more of the associated listed items. An expression such as "at least one of" when preceding a list of elements may modify the entire list of elements and may not modify the individual elements of the list. The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

In construing an element or numerical value, the element or the numerical value is to be construed as including an error or tolerance range even where no explicit description of such an error or tolerance range is provided.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly connected to or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. In the description of the various embodiments of the present disclosure, where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used.

Further, as used herein, when a layer, film, region, plate, or the like may be disposed "on" or "on a top" of another layer, film, region, plate, or the like, the former may directly contact the latter or another layer, film, region, plate, or the like may be disposed between the former and the latter. As used herein, when a layer, film, region, plate, or the like is directly disposed "on" or "on a top" of another layer, film, region, plate, or the like, the former directly contacts the latter and another layer, film, region, plate, or the like is not disposed between the former and the latter. Further, as used herein, when a layer, film, region, plate, or the like may be disposed "below" or "under" another layer, film, region, plate, or the like, the former may directly contact the latter or another layer, film, region, plate, or the like may be disposed between the former and the latter. As used herein, when a layer, film, region, plate, or the like is directly disposed "below" or "under" another layer, film, region, plate, or the like, the former directly contacts the latter and another layer, film, region, plate, or the like is not disposed between the former and the latter.

In descriptions of temporal relationships, for example, temporal precedent relationships between two events such as "after", "subsequent to", "before", "next," etc., another event may occur therebetween unless a more limiting term, "just," "immediate(ly)," or "direct(ly)" ("directly after", "directly subsequent", "directly before") is indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or overall combined with each other, and may be variously inter-operated with each other and driven technically as those skilled in the art can sufficiently understand. The embodiments may be implemented independently of each other and may be implemented together in a co-dependent relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale in which each of elements is illustrated in the accompanying drawings may differ from an actual scale. Thus, the illustrated elements are not limited to the specific scale in which they are illustrated in the drawings.

The display apparatus according to an example embodiment of the present disclosure may be applied to an organic light-emitting display apparatus. The disclosure is not limited thereto. The display apparatus according to an example embodiment of the present disclosure may be applied to various display apparatuses such as a micro LED display apparatus or a quantum dot display apparatus.

Hereinafter, a display apparatus according to example embodiments of the present disclosure will be described in detail with reference to the drawings.

Figure 1B:
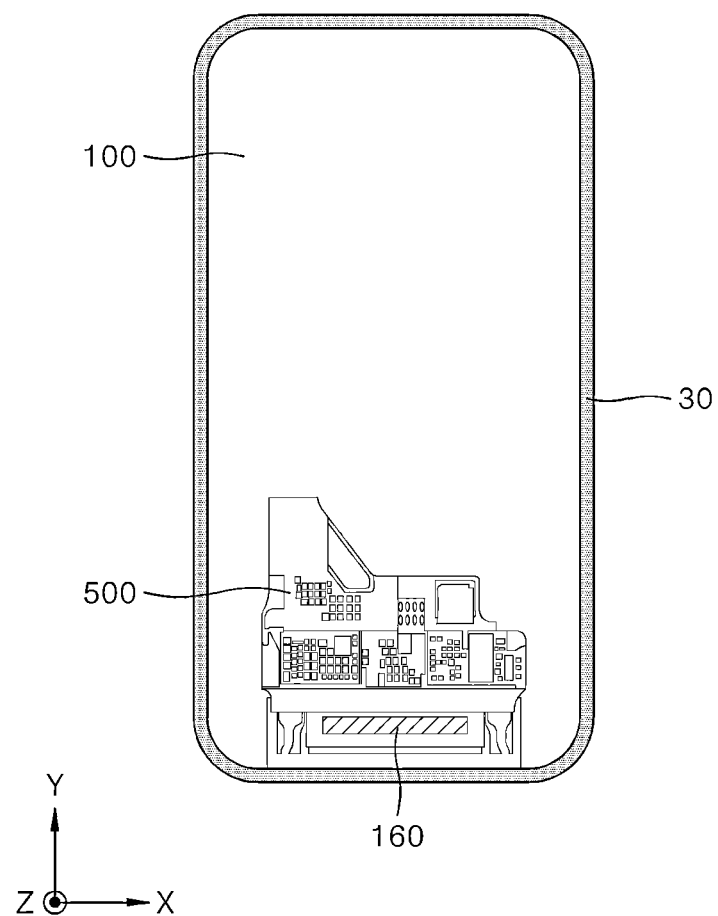
FIG. 1B illustrates a back face of the display apparatus in which a casing is removed.
Figure 1C:
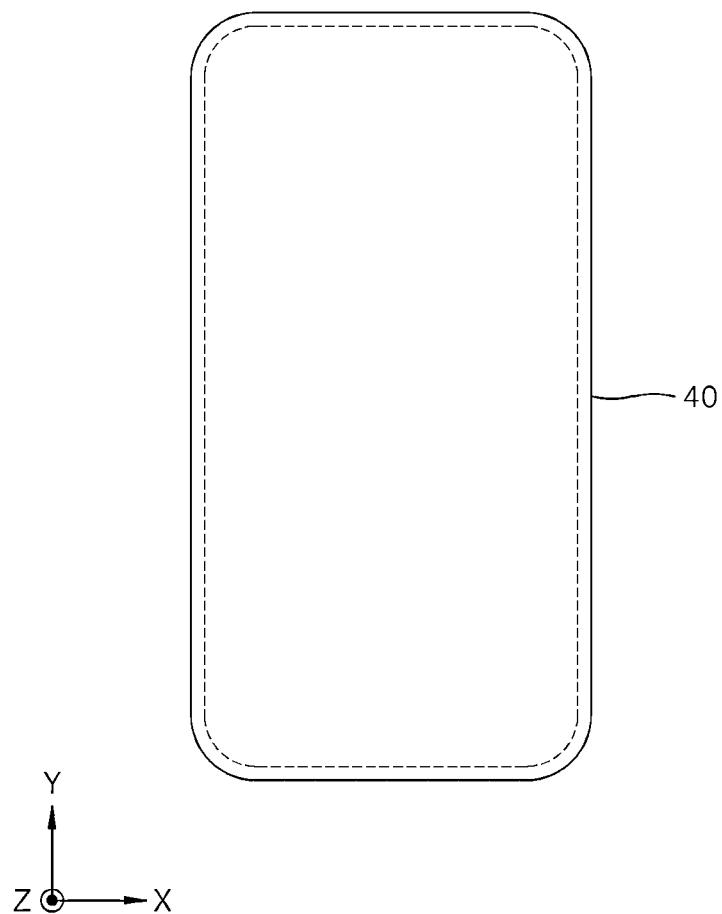

FIG. 1A and FIG. 1C illustrate front and back faces, respectively, of a display apparatus according to an example embodiment of the present disclosure. FIG. 1B illustrates a back face of the display apparatus in which a casing is removed.

As used herein, each of frontward and upward directions may be defined by a Z-axis direction, and each of backward and downward directions may be defined by a −Z-axis direction.

An example embodiment of a display apparatus 1 may include a cover member 20 and a display panel 100 attached to a bottom of the cover member 20. A direction from the top to the bottom of the cover member 20 may be defined by the downward direction (−Z axis direction).

The cover member 20 may be disposed to cover the entire surface of the display apparatus 1 to protect the display apparatus 1 from external impact.

An edge portion of the cover member 20 may have a curved portion or a bent portion that is curved or bent toward the back face of the display apparatus 1.

Since the cover member 20 may be disposed to cover a side face of the display panel 100 of the display apparatus 1, the cover member 20 may protect the display panel 100 from external impact not only on the front face of the display apparatus 1 but also on a side face thereof.

The cover member 20 may overlap the display area AA of the display panel that displays an image. For example, the cover member 20 may be made of a transparent plastic material that may transmit an image therethrough. Alternatively, the cover member 20 may be made of a cover glass of a transparent glass material. The present disclosure is not limited thereto.

A casing 40 for supporting the cover member 20 may be disposed on the back face of the display apparatus 1.

The casing 40 may serve as a housing that protects the rear face of the display apparatus 1. The casing 40 may function as a casing constituting the outermost shell of the display apparatus 1.

The casing 40 may be made of various materials such as plastic, metal, or glass.

A middle frame 30 may be additionally disposed between the cover member 20 and the casing 40.

The middle frame 30 may accommodate therein the display panel 100. One side of the middle frame 30 may contact the cover member 20 such that the middle frame supports the cover member 20.

The middle frame 30 may serve as a housing that protects the rear face of the display panel 100. Additional details relating to the middle frame 30 will be provided below with reference to FIG. 7.

A front portion FP of the display panel 100 may be disposed on a bottom face of the cover member 20.

The front portion FP may include a pixel array including a plurality of pixels having a plurality of light-emitting elements, and driving transistors, and signal lines transmitting a drive signal to the pixels, so that an image may be displayed from the front portion FP.

The front portion FP may include a display area AA (active area) where the image is displayed and a non-display area NA (non-active area) other than the display area AA. The non-display area NA may be formed as an edge area surrounding the display area AA.

The display area AA and the non-display area NA may also be applicable to the cover member 20.

An area of the cover member 20 through which the image transmits may be the display area AA of the cover member 20.

An area of the cover member 20, which surrounds the display area AA, and through which the image does not transmit may be a non-display area NA of the cover member 20.

The non-display area NA may be defined as a bezel area.

The display panel 100 disposed under the cover member 20 may include a bent portion BND, as described further below in relation to FIG. 2. The bent portion BND extends from one side of the front portion FP and is bent downwardly.

The bent portion BND may be located at the outermost part of the display panel 100. Thus, the bent portion BND may be exposed to external impact. The bent portion BND may be easily deformed or broken in the event that the impact is applied thereto. Accordingly, a support member or a reinforcing member for protecting the bent portion may be added to absorb the impact.

Hereinafter, a structure of the display apparatus 1 according to an example embodiment of the present disclosure will be described.

Figure 2:
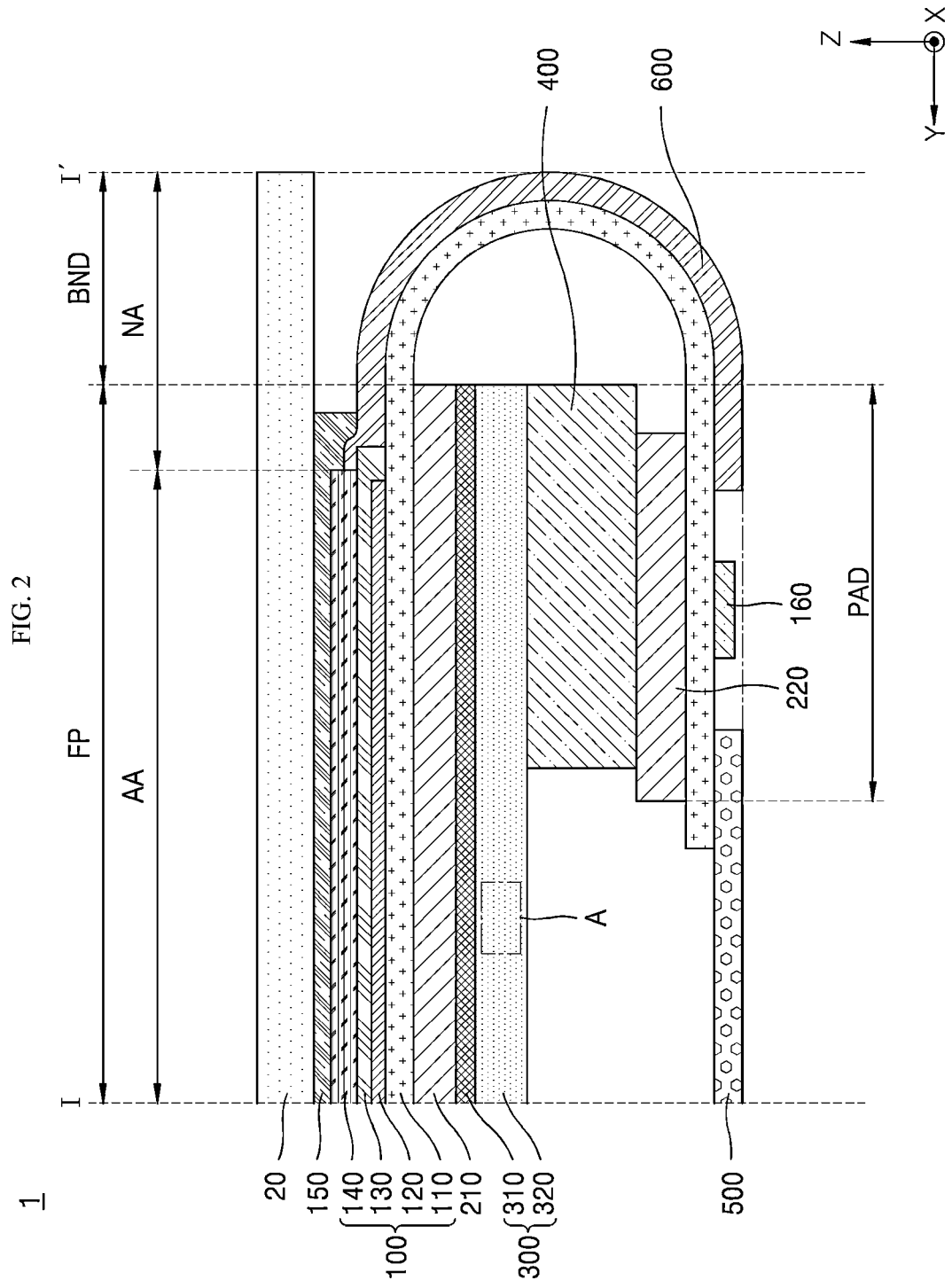
FIG. 2 is a cross-sectional view of a I-I' direction, as shown in FIG. 1A, of the display apparatus according to an example embodiment of the present disclosure.

FIG. 2 is a cross-sectional view of a I-I' direction, as shown in FIG. 1A, of the display apparatus according to an example embodiment of the present disclosure.

The display apparatus 1 may include the cover member 20 as the topmost portion and the display panel 100 disposed under the cover member 20.

The display apparatus 1 may include the display panel 100 having the front portion FP, a bent portion BND, and a pad portion PAD bending and extending from the bent portion BND so as to be positioned on a back face of the front portion FP, a cushion plate 300 disposed between the front portion FP and the pad portion PAD, and disposed below the front portion FP, and a second connection member 400 as a connection member disposed between the cushion plate 300 and the pad portion PAD to fix the cushion plate 300 and the pad portion PAD to each other.

A first plate 210 may be disposed between the front portion FP and the cushion plate 300. A second plate 220 may be disposed between the second connection member 400 and the pad portion PAD.

Thus, the first plate 210, the cushion plate 300, the second connection member 400, the second plate 220, and the pad portion PAD may be sequentially disposed under the front portion FP of the display panel 100.

A first connection member 150 may be disposed between the cover member 20 and the display panel 100.

The first connection member 150 may connect or couple the cover member 20 and the display panel 100 to each other.

For example, the first connection member 150 may act as a fixing member. The present disclosure is not limited to the terminology used herein.

Since the first connection member 150 may be disposed to overlap the display area AA along a thickness direction of the display apparatus, the first connection member 150 may be made of a material through which the image of the display panel 100 may be transmitted.

For example, the first connection member 150 may be made of or may include a material such as an optical clear adhesive (OCA), an optical clear resin (OCR), or a pressure sensitive adhesive (PSA). However, the present disclosure is not limited thereto.

The display panel 100 disposed under the cover member 20 may include the front portion FP, the bent portion BND, and the pad portion PAD, all of which may include a display substrate 110.

The front portion FP of the display panel 100 may be disposed under the first connection member 150. For example, the front portion FP may be a portion where the image is displayed. The front portion FP may include the display substrate 110, the pixel array 120, the encapsulation portion 130, and a polarizing plate 140 on a top face of the encapsulation portion 130.

The bent portion BND of the display panel 100 may extend from one side of the front portion FP and be bent downwardly (in the −Z-axis direction) and then horizontally (in a Y-axis direction). The bent portion BND may include the display substrate 110 and the signal line.

The pad portion PAD of the display panel 100 may extend from the bent portion BND and be disposed under the front portion FP.

The pad portion PAD may include the display substrate 110, the signal line, and a pad electrode connected to the signal line. A driver circuit 160 or a flexible circuit board 500 for driving a pixel may be mounted on the pad electrode.

The display panel 100 may include the polarizing plate 140, which may constitute a top portion of the front portion FP. In addition, a functional layer to improve display performance of the display apparatus may be further disposed between the first connection member 150 and the polarizing plate 140.

The polarizing plate 140 may prevent or reduce reflection of external light. The polarizing plate 140 may improve the outdoor visibility and contrast ratio of the image displayed on the display panel 100.

The display panel 100 may include the display substrate 110, the pixel array 120 disposed on the display substrate 110, and the encapsulation portion 130 disposed to cover the pixel array 120.

A portion of the display substrate 110 may constitute a bottom of the display panel 100.

The display substrate 110 may constitute a portion of each of the front portion FP, the bent portion BND, and the pad portion PAD.

The display substrate 110 may be made of a flexible plastic material. The display substrate 110 may have flexibility.

The display substrate 110 may include polyimide. Alternatively, the display substrate 110 may be made of a thin glass material having flexibility.

The pixel array 120 may be disposed on the display substrate 110. The pixel array 120 may display an image. An area where the pixel array 120 may be disposed may be the display area AA.

Accordingly, an area of the cover member 20 corresponding to the pixel array 120 may be a display area AA of the cover member 20 An area of the cover member 20 other than the display area AA may be a non-display area NA of the cover member 20.

The pixel array 120 may include light-emitting elements, thin-film transistors for driving the light-emitting elements, and the signal lines such as a gate line, a data line, and a pixel driving power line on the display substrate 110.

The pixel array 120 may include pixels that display images based on signals supplied to the signal lines. Each pixel may include a light-emitting element and a thin-film transistor.

The light-emitting element may include an anode electrically connected to the thin-film transistor, a light-emitting layer formed on the anode, and a cathode for supplying a common voltage.

The thin-film transistor may include a gate electrode, a semiconductor layer, a source electrode, and a drain electrode. The semiconductor layer of the thin-film transistor may include silicon such as a-Si, poly-Si, or low-temperature poly-Si. Alternatively, the semiconductor layer of the thin-film transistor may include an oxide such as Indium-Gallium-Zinc-Oxide (IGZO). The present disclosure is not limited thereto.

The anode may be disposed in each pixel. The anode may be disposed in a corresponding manner to an opening area defined according to a pattern shape of the pixel. The anode may be electrically connected to the thin-film transistor.

The light-emitting element may include a light-emitting layer formed between the anode and the cathode. The light-emitting element may be configured to emit light of the same color such as white light for each pixel. Alternatively, the light-emitting element may be configured to emit light of a different color such as red, green, or blue for each pixel.

The encapsulation portion 130 may be disposed on the display substrate 110 so as to cover the pixel array 120.

The encapsulation portion 130 may prevent or reduce penetration of oxygen, moisture, or foreign material into the light-emitting layer of the pixel array 120. For example, the encapsulation portion 130 may be formed in a multi-layer structure in which an organic material layer and an inorganic material layer are alternately stacked. The present disclosure is not limited thereto.

The front portion FP of the display panel 100 may include the display substrate 110, the pixel array 120, and the encapsulation portion 130. The front portion FP may be formed in a flat manner except for an edge portion thereof.

The first plate 210 may be connected or coupled to the back face of the front portion FP so as to maintain the flat state of the front portion FP.

The bent portion BND of the display panel 100 may be free of the pixel array 120, the encapsulation portion 130, and the first plate 210. The bent portion BND may include the display substrate 110. The bent portion BND may be a portion that may be easily bent in a direction desired by the user.

The pad portion PAD of the display panel 100 may be free of the pixel array 120 and the encapsulation portion 130.

The second plate 220 may be connected or coupled to a back face of the pad portion PAD so that the pad portion PAD may be maintained in the flat state.

Therefore, the front portion FP of the display panel 100 may be disposed in the area in which the screen is displayed. The pad portion PAD may bend and extend from the bent portion BND horizontally and inwardly. The pad portion PAD may be disposed below the front portion FP, that is, on the back face of the front portion FP.

The first plate 210 disposed under the front portion FP of the display panel 100 and the second plate 220 disposed above the pad portion PAD may be disposed under the display substrate 110. The first plate 210 and the second plate 220 may maintain the front portion FP in the flat state while complementing the stiffness of the display substrate 110.

Each of the first plate 210 and the second plate 220 may be formed to have a certain strength and thickness to complement the stiffness of the display substrate 110. Each of the first plate 210 and the second plate 220 may not be formed in a bent portion area where the bent portion BND is located.

Based on a shape of the display panel 100 before the display panel 100 is bent, the first plate 210 and the second plate 220 may be disposed under the display substrate 110. The first plate 210 and the second plate 220 may be spaced apart from each other.

Based on a shape of the display panel 100 after the display panel 100 is bent, the first plate 210 may be disposed under the front portion FP. The second plate 220 may be disposed on the top face of the pad portion PAD.

Each of the first plate 210 and the second plate 220 may act a back plate disposed on the rear face of the display substrate 110.

Each of the first plate 210 and the second plate 220 may be composed of a plastic thin film having stiffness.

For example, each of the first plate 210 and the second plate 220 may be made of polyethylene terephthalate (PET), polyimide (PI), polyethylene naphthalate (PEN), etc. However, the disclosure is not limited thereto.

The first plate 210 and the second plate 220 may be made of the same material. The first plate 210 and the second plate 220 may have the same thickness. However, the disclosure is not limited thereto.

Based on the shape after the display panel 100 is bent, the cushion plate 300 may be disposed between the first plate 210 and the second plate 220.

The cushion plate 300 may be disposed under the first plate 210.

The cushion plate 300 may include a first adhesive member 310 and a porous member 320. In an example embodiment, the porous member 320 may be a metal foam.

Since the porous member 320 may function as a cushion layer of the cushion plate 300, such that the impact to various parts that may come into contact with the cushion plate 300 may be reduced.

The porous member 320 with an impact reducing function may reinforce the stiffness of the cushion plate 300. The porous member 320 will be described below in more detail with reference to FIG. 3.

The second connection member 400 and the second plate 220 may be disposed under the cushion plate 300.

The second connection member 400 may be disposed between the cushion plate 300 and the pad portion PAD.

In some embodiments in which the pad portion PAD of the display panel 100 bends from the bent portion BND so as to be disposed under the front portion FP of the display panel 100, a restoring force to restore the display panel 100 to a state before bending may be strong.

In an embodiment in which a strong restoring force is applied, a lifting phenomenon in which the pad portion PAD of the bent display panel 100 is not fixed and is detached may occur.

The second connection member 400 may function as a fixing member that fixes the bent display panel 100 so that the display panel may maintain its bent shape.

The second connection member 400 may be formed to have a constant thickness in a thickness direction so as to maintain a constant curvature of the bent portion BND.

In an embodiment, the second connection member 400 may be a double-sided tape having adhesive strength such that the second connection member 400 may fix the second plate 220 and the porous member 320 to each other. The present disclosure is not limited thereto.

In an alternate embodiment, the second connection member 400 may be a foam tape or a foam pad having an adhesive force so as to further exhibit an effect of mitigating the impact.

The second plate 220 may be disposed under the second connection member 400.

In placing the second plate 220, the second plate 220 may be first attached to the back face of the pad portion PAD, the bent portion BND may be bent, and the second plate 220 may be attached and fixed to a bottom of the second connection member 400.

In a state in which the second plate 220 is fixed to the second connection member 400, the second plate 220 may be disposed on the pad portion PAD.

For example, the second connection member 400 and the second plate 220 may be disposed between the porous member 320 of the cushion plate 300 and the pad portion PAD.

In a state in which the second plate 220 is fixed to the second connection member 400, an outer face as a top face of the bent portion BND may be exposed to the outside. In some embodiments, the outer face of the bent portion BND may face the reinforcing member 600. A bottom face as an inner face of the bent portion BND may face the cushion plate 300 and the second connection member 400.

The reinforcing member 600 may be disposed on the outer face of the bent portion BND of the display panel 100.

The reinforcing member 600 may cover the bent portion BND. The reinforcing member 600 may extend to cover at least a portion of each of the front portion FP and the pad portion PAD.

The reinforcing member 600 may include a resin. For example, the reinforcing member 600 may include an UV-curable acrylic resin. The present disclosure is not limited thereto.

Since the reinforcing member 600 may cover various signal lines disposed between the encapsulation portion 130 of the display panel 100 and the pad portion PAD, the member 600 may prevent or reduce the penetration of moisture into the signal lines while protecting the signal line from the external impact.

In order to increase the flexibility of the display panel 100, the bent portion BND may be free of other components except for the display substrate 110 and the signal lines. Thus, the reinforcing member 600 may supplement the stiffness of the bent portion BND in which the other components are absent.

In one example, the driver circuit 160 may be disposed on the face opposing a face of the pad portion PAD of the display panel 100 on which the second plate 220 may be disposed.

The driver circuit 160 may be disposed in a form of a chip on plastic (COP) mounted on the display substrate 110. However, the present disclosure is not limited thereto.

The driver circuit 160 may generate a data signal and a gate control signal based on image data and a timing synchronization signal supplied from an external host driving system.

The driver circuit 160 may supply a data signal to the data line of each pixel via a display pad. The driver circuit 160 may supply a gate control signal to a gate driver circuit via the display pad.

The driver circuit 160 may be mounted in a chip mounting area defined in the display substrate 110. The driver circuit 160 may be electrically connected to the display pad. The driver circuit 160 may be connected to the signal lines of the gate driver circuit and the pixel array 120 disposed on the display substrate 110.

The display pad may be disposed at a distal end of the display substrate 110 on which the driver circuit 160 is mounted.

The display pad may be disposed on one face of the display substrate 110 and electrically connected to the flexible circuit board 500 on which a circuit board is mounted.

The flexible circuit board 500 may be electrically connected to the display pad disposed on the distal end of the display substrate 110 via a film attachment process using a conductive adhesive layer. The flexible circuit board 500 may be positioned on the back face of the display panel 100.

One example of a material of the conductive adhesive layer may include an anisotropic conductive film (ACF).

The circuit board may provide the image data and the timing synchronization signal supplied from the host driving system to the driver circuit 160. The circuit board may provide a voltage to drive each of the pixel array 120, the gate driver circuit, and the driver circuit 160.

Figure 3:
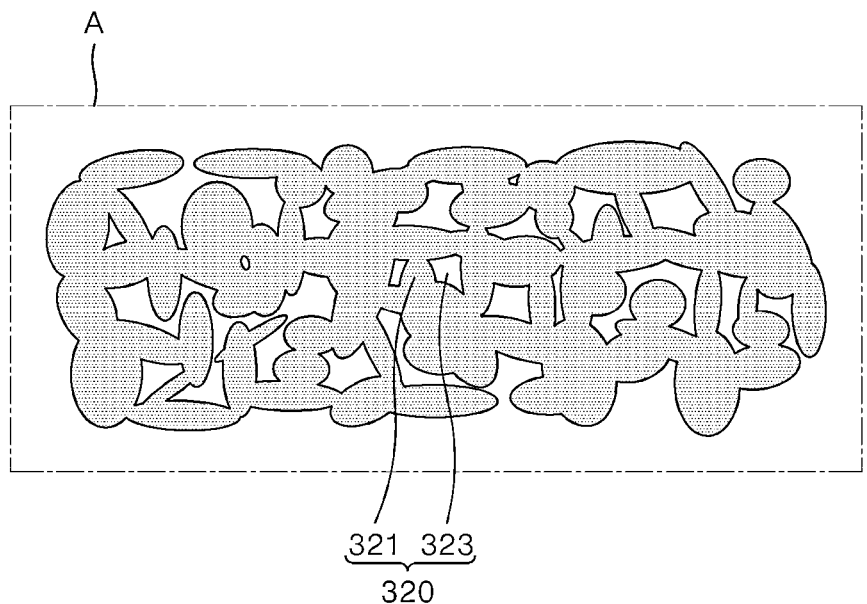
FIG. 3 is an enlarged cross-sectional view of a porous member according to an example embodiment of the present disclosure.

FIG. 3 is an enlarged cross-sectional view of a porous member according to an example embodiment of the present disclosure.

As illustrated in FIG. 3, the porous member 320 may be a porous metal structure including a conductive metal 321 and a plurality of pores 323 positioned inside the conductive metal 321.

Since the conductive metal 321 of the porous member 320 is made of a metal with high thermal conductivity, the porous member 320 itself may provide an excellent heat-dissipation function. Because the porous member 320 has a metal structure with the plurality of pores 323 formed therein, the porous member 320 may provide an excellent cushion function.

Further, since the porous member 320 may include the plurality of pores 323 inside the conductive metal 321, and the overall surface area of the porous member 320 may be increased, such that the porous member 320 itself may provide an excellent heat-dissipation function.

The porous member 320 may be formed using the following manufacturing method by way of example. The present disclosure is not limited thereto.

The porous member 320 may be formed by sintering a metal foam precursor containing a metal powder.

The metal foam precursor refers to a structure that exists before the process, such as the sintering, to form the porous member 320 is performed.

For example, the metal foam precursor may be formed using a slurry containing a metal powder, a dispersant, and a binder.

The metal powder may be a metal powder including one or more metal powders among a copper powder, a nickel powder, an iron powder, a stainless use steel (SUS) powder, a molybdenum powder, a silver powder, a platinum powder, a gold powder, an aluminum powder, a chromium powder, an indium powder, a tin powder, a magnesium powder, a phosphorus powder, a zinc powder, and a manganese powder. Alternatively, the metal powder may be or may include a powder of an alloy of one or more metals. The present disclosure is not limited thereto.

The dispersant may be, for example, alcohol, but may not be limited thereto.

In this case, the alcohol may be a monohydric alcohol having 1 to 20 carbon atoms, such as methanol, ethanol, propanol, pentanol, octanol, ethylene glycol, propylene glycol, pentanol, 2-methoxyethanol, 2-ethoxyethanol, 2-butoxyethanol, glycerol, texanol, or terpineol. The alcohol may be a dihydric alcohol having 1 to 20 carbon atoms, such as ethylene glycol, propylene glycol, hexanediol, octanediol, or pentanediol The alcohol may be a polyhydric alcohol. The present disclosure is not limited thereto.

A type of binder may not be particularly limited, and may be selected based on a type of the metal powder or the dispersant used in preparing the slurry.

For example, the binder may be a alkyl cellulose having an alkyl group having 1 to 8 carbon atoms, such as methyl cellulose or ethyl cellulose, polyalkylene carbonate having an alkylene unit having 1 to 8 carbon atoms, such as polypropylene carbonate or polyethylene carbonate, or a polyvinyl alcohol-based binder, such as polyvinyl alcohol or polyvinyl acetate, but may not be limited thereto.

After forming the slurry that contains the metal powder, the dispersant, and the binder as described above, the slurry may be injected into a mold having a predetermined shape or coated on a substrate to form the metal foam precursor.

The metal foam precursor thus formed may be formed into the porous member 320 through the sintering process.

In this case, conditions of the sintering process are not particularly limited as long as the sintering process is performed at a temperature and for a duration at which the solvent present in the slurry may be removed to a desired level. For example, the sintering may be performed in a temperature in a range of from about 50° C. to 250° C. for a predetermined time, but may not be limited thereto.

The cushion plate 300 may be formed by forming the porous member 320 and then attaching the first adhesive member 310 to one face of the porous member 320.

Alternatively, a metal foam precursor may be formed on the first adhesive member 310 and may be sintered to form the cushion plate 300 including the porous member 320. The manufacturing process of the cushion plate 300 is not particularly limited.

The first adhesive member 310 may be formed on one face of the porous member 320 so as to have a certain thickness.

The first adhesive member 310 may include an adhesive component such that the porous member 320 may be fixed to the first plate 210 via the first adhesive member 310.

The first adhesive member 310 may be made of or may include a material such as an optical clear adhesive (OCA), an optical clear resin (OCR), or a pressure sensitive adhesive (PSA).

Figure 4:
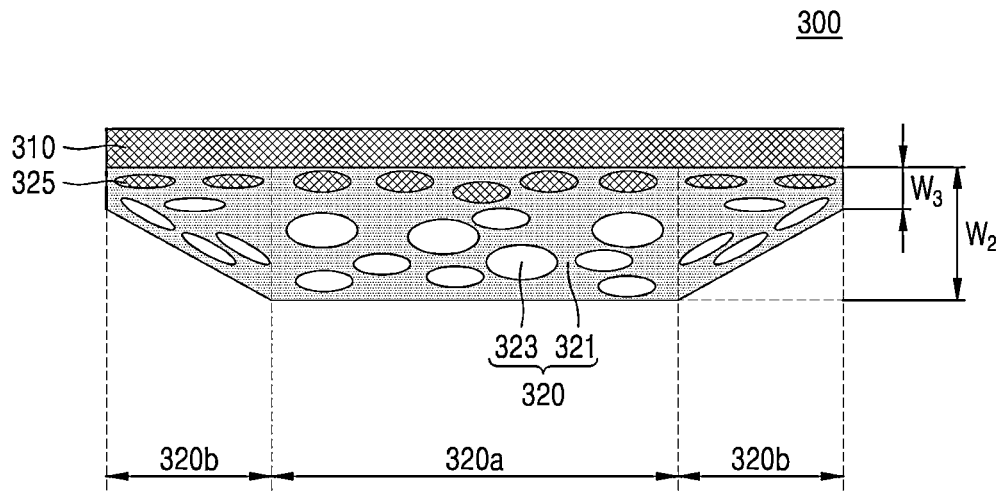
FIG. 4 is a cross-sectional view of a cushion plate according to an example embodiment of the present disclosure.
Figure 5:
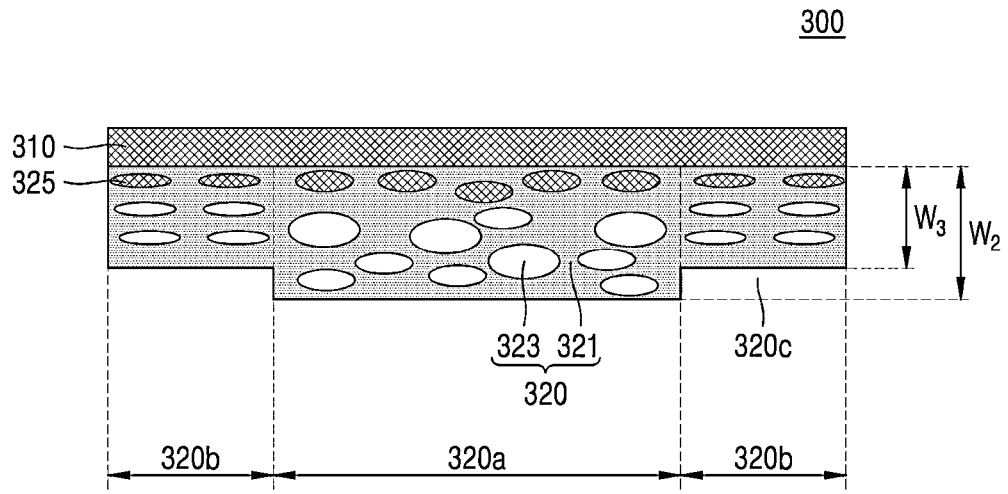
FIG. 5 is a cross-sectional view of a cushion plate according to another example embodiment of the present disclosure.
Figure 6:
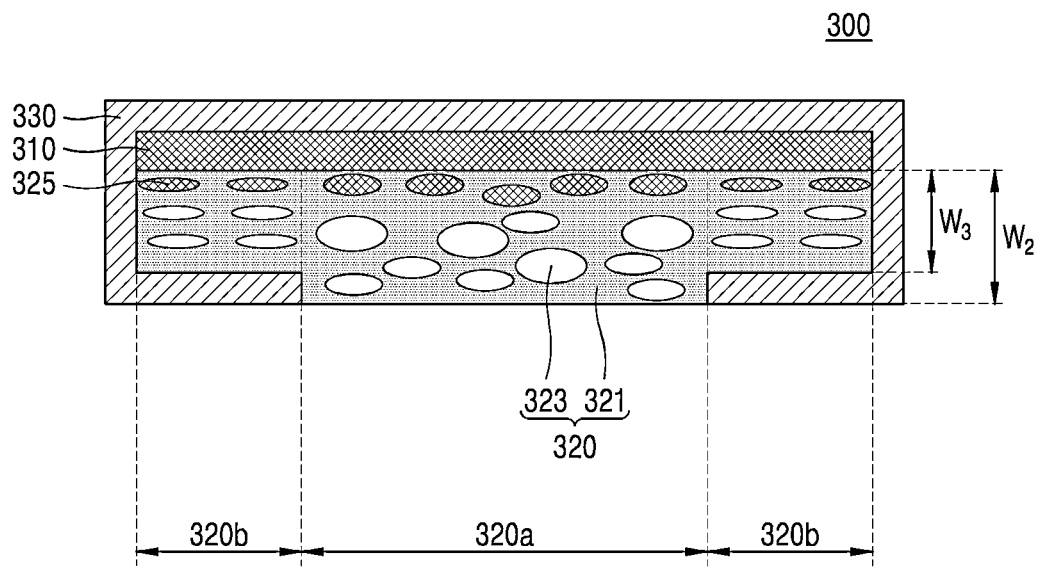
FIG. 6 is a cross-sectional view of a cushion plate according to yet another example embodiment of the present disclosure.

Hereinafter, with reference to FIGS. 4 to 6, various aspects of the cushion plate according to an example embodiment of the present disclosure will be described. FIG. 4 is a cross-sectional view of a cushion plate according to an example embodiment of the present disclosure. FIG. 5 is a cross-sectional view of a cushion plate according to another example embodiment of the present disclosure. FIG. 6 is a cross-sectional view of a cushion plate according to yet another example embodiment of the present disclosure.

As illustrated in FIG. 4, the cushion plate 300 may include the first adhesive member 310, and the porous member 320 including a conductive metal 321, and a plurality of pores 323 positioned inside the conductive metal 321.

The porous member 320 may include a body portion area 320a and a side portion area 320b disposed along a side face of the body portion area 320a. The body portion area 320a and the side portion area 320b are not physically separated from each other. The body portion area 320a and the side portion area 320b may be positionally separated from each other.

A thickness of the side portion area 320b of the porous member 320 may be smaller than a thickness of the body portion area 320a.

For example, the side portion area 320b may have an inclined face such that the thickness thereof decreases as the side portion area 320b extends from one side of the side portion area 320b closer to the body portion area 320a toward the other side of the side portion area 320b.

Therefore, the thickness of the side portion area 320b may be gradually reduced from a second thickness $W_2$, which corresponds to the thickness of the body portion area 320a, to a third thickness $W_3$, which corresponds to a thickness of an end of the side portion area 320b furthest from the body portion area 320a.

Further, a porosity of the side portion area 320b may be lower than a porosity of the body portion area 320a.

In the porous member 320 according to an example embodiment of the present disclosure, the side portion area 320b is compressed at a greater pressure than a pressure at which the body portion area 320a is compressed. Thus, the thickness of the side portion area 320b is smaller than the thickness of the body portion area 320a. The porosity of the side portion area 320b is lower than the porosity of the body portion area 320a.

In order to decrease the porosity of the porous member 320, a predetermined pressure may be applied to the porous member 320 to reduce the porosity.

In an aspect of the present disclosure, the porosity may be lowered by applying pressure to not only the body portion area 320a of the porous member 320 but also the side portion area 320b, while a higher pressure may be applied to the side portion area 320b such that the thickness of the side portion area 320b is smaller than the thickness of the body portion area 320a. The porosity of the side portion area 320b is lower than the porosity of the body portion area 320a.

The cushion plate 300 according to an example embodiment of the present disclosure as described above may have an improved impact stiffness because the cushion plate may include the porous member 320 having the plurality of pores 323 formed therein.

Further, in the cushion plate 300 according to an example embodiment of the present disclosure, the pores 323 may be compressed in the side portion area 320b as well as the body portion area 320a of the porous member 320. Thus, the cushion plate may have improved hardness and push stiffness.

Further, the cushion plate 300 according to an example embodiment of the present disclosure may have further improved hardness and push stiffness in the side portion area 320b because the porosity of the side portion area 320b is lower than the porosity of the body portion area 320a.

In addition, the cushion plate 300 according to an example embodiment of the present disclosure is compressed so that the side portion area 320b with improved push stiffness has an inclined face. Thus, the cushion plate 300 may reduce bending stress in a curved display apparatus having a curvature. The cushion plate 300 may reduce lift-off phenomenon to improve reliability.

At least a portion of the first adhesive member 310 may penetrate the pores 323 of the porous member 320. Accordingly, the pores 323 of the porous member 320 adjacent to the first adhesive member 310 may become the filled pores 325 filled with the adhesive material.

In order to bond the first adhesive member 310 and the porous member 320 to each other, a predetermined pressure may be applied thereto such that the adhesive material of the first adhesive member 310 may fill the pores 323 of the porous member 320.

In this way, the cushion plate 300 according to an example embodiment of the present disclosure may include the filled pores 325 filled with the adhesive material of the first adhesive member 310. Thus, the thickness of the cushion plate 300 may be reduced by reducing the thickness of the first adhesive member 310. Further, as the porosity is reduced, further improved push stiffness may be obtained.

As illustrated in FIG. 5, the cushion plate 300 may include the first adhesive member 310 and the porous member 320 including the conductive metal 321 and the plurality of pores 323 positioned inside the conductive metal 321.

The porous member 320 may include the body portion area 320a and the side portion area 320b disposed along a side face of the body portion area 320a. The body portion area 320a and the side portion area 320b may not physically separated from each other. The body portion area 320a and the side portion area 320b may be conceptually and positionally separated from each other.

The thickness of the side portion area 320b of the porous member 320 may be smaller than the thickness of the body portion area 320a.

A third thickness $W_3$, which is the thickness of the side portion area 320b, may be smaller than a second thickness $W_2$, which is the thickness of the body portion area 320a.

In this case, the side portion area 320b, which has a thickness smaller than that of the body portion area 320a, may have a constant thickness.

Therefore, the porous member may further include a step area 320c located directly below the side portion area 320b. The step area 320c may have a thickness corresponding to the difference between the thicknesses of the body portion area 320a and the side portion area 320b.

Further, the porosity of the side portion area 320b may be lower than the porosity of the body portion area 320a.

In the porous member 320 according to an example embodiment of the present disclosure, the side portion area 320b may be compressed at a greater pressure than a pressure at which the body portion area 320a may be compressed, such that the thickness of the side portion area 320b may be smaller than the thickness of the body portion area 320a. The porosity of the side portion area 320b may be lower than the porosity of the body portion area 320a.

In order to decrease the porosity of the porous member 320, a predetermined pressure may be applied to the porous member 320 to reduce the porosity.

In an aspect of the present disclosure, the porosity may be lowered by applying the pressure to not only the body portion area 320a of the porous member 320 but also the side portion area 320b, while the higher pressure may be applied to the side portion area 320b such that the thickness of the side portion area 320b may be smaller than that of the body portion area 320a. The porosity of the side portion area 320b may be lower than the porosity of the body portion area 320a.

The cushion plate 300 according to an example embodiment of the present disclosure as described above may have an improved impact stiffness because the cushion plate may include the porous member 320 including the plurality of pores 323.

Further, in the cushion plate 300 according to an example embodiment of the present disclosure, the pores 323 may be compressed in the side portion area 320b as well as the body portion area 320a of the porous member 320. Thus, the cushion plate may have improved overall hardness and push stiffness.

Further, the cushion plate 300 according to an example embodiment of the present disclosure may have further improved hardness and push stiffness in the side portion area 320b because the porosity of the side portion area 320b is lower than the porosity of the body portion area 320a.

At least a portion of the first adhesive member 310 may penetrate the pores 323 of the porous member 320. Accordingly, the pores 323 of the porous member 320 adjacent to the first adhesive member 310 may become the filled pores 325 filled with the adhesive material.

In order to bond the first adhesive member 310 and the porous member 320 to each other, a predetermined pressure may be applied thereto such that the adhesive material of the first adhesive member 310 may fill the pores 323 of the porous member 320.

In this way, the cushion plate 300 according to an example embodiment of the present disclosure may include the filled pores 325 filled with the adhesive material of the first adhesive member 310. Thus, the thickness of the cushion plate 300 may be reduced by reducing the thickness of the first adhesive member 310. Further, as the porosity is reduced, further improved push stiffness may be obtained.

As illustrated in FIG. 6, the cushion plate 300 according to the example embodiment of FIG. 5 may further include a conductive member 330 surrounding the first adhesive member 310 and at least a portion of the porous member 320.

In this case, the conductive member 330 may be formed to surround the first adhesive member 310 and the side portion area 320b of the porous member 320.

The conductive member 330 may include a material with high thermal conductivity. The conductive member may improve the heat-dissipation effect of the cushion plate 300. For example, the conductive member 330 may include a metal having high thermal conductivity such as copper (Cu), aluminum (Al), or graphite, and the like. The present disclosure is not limited thereto.

Further, the conductive member 330 may include stainless use steel (SUS). In an embodiment, the conductive member 330 may be a SUS plate.

In an embodiment, the conductive member 330 includes SUS and may have higher thermal conductivity and strength while having a smaller thickness compared to an embodiment in which the conductive member is made of a metal other than SUS.

Since the conductive member 330 is formed to surround the first adhesive member 310 and the side portion area 320b of the porous member 320, the push stiffness of the cushion plate 300 including the side portion area 320b may be further improved.

Figure 7:
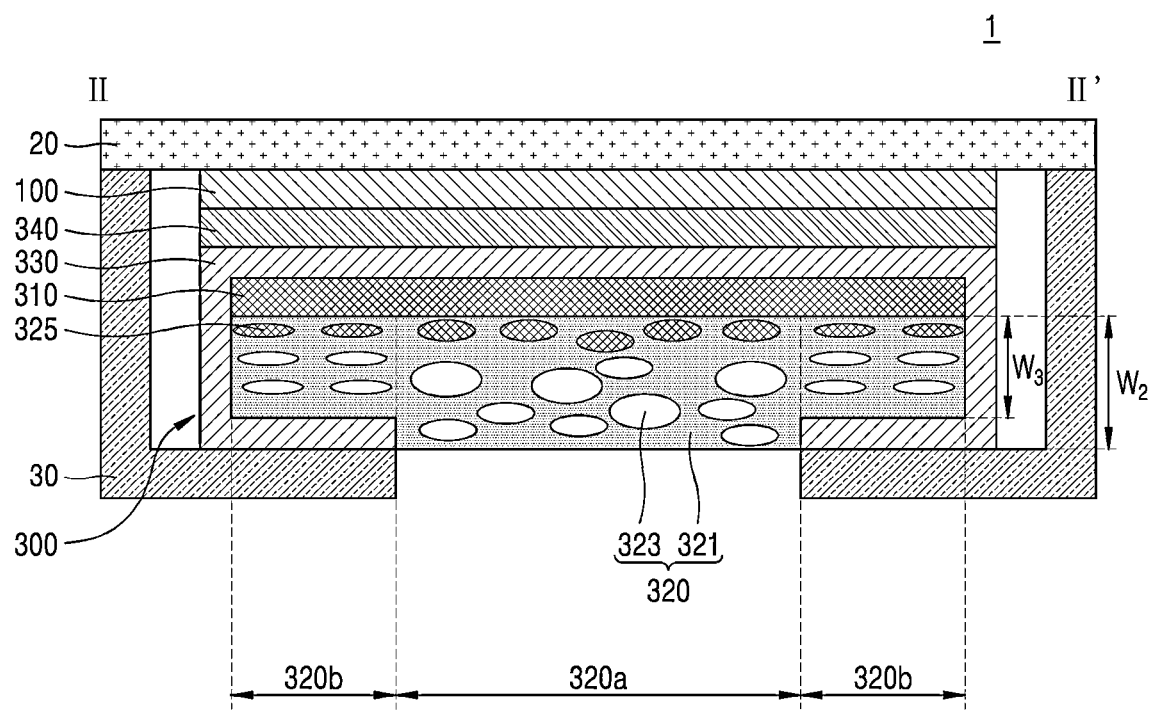
FIG. 7 is a cross-sectional view in a II-II' direction, as shown in FIG. 1A, of a display apparatus according to an example embodiment of the present disclosure.

FIG. 7 is a cross-sectional view in a II-II' direction, as shown in FIG. 1A, of a display apparatus according to an example embodiment of the present disclosure.

The display apparatus 1 according to an example embodiment of the present disclosure may include the display panel 100 that displays a screen, and the cushion plate 300 disposed under the display panel 100, wherein the cushion plate 300 may include the first adhesive member 310 and the porous member 320.

The porous member 320 may include the body portion area 320a and the side portion area 320b disposed along a side face of the body portion area 320a.

The thickness of the side portion area 320b of the porous member 320 may be smaller than the thickness of the body portion area 320a. The porosity of the side portion area 320b may be lower than the porosity of the body portion area 320a.

The cushion plate 300 may further include the conductive member 330 covering the first adhesive member 310 and at least a portion of the porous member 320.

In this case, the conductive member 330 may be formed to surround the first adhesive member 310 and the side portion area 320b of the porous member 320.

The cushion plate 300 including the conductive member 330 may be fixed to one face of the display panel 100 via a second adhesive member 340.

The display apparatus 1 may further include the cover member 20 disposed on the display panel 100 and the middle frame 30 disposed under the cushion plate 300.

A middle frame 30 may be additionally disposed between the cover member 20 and the casing 40.

The middle frame 30 may accommodate therein the display panel 100. One side of the middle frame 30 may contact the cover member 20 such that the middle frame supports the cover member 20.

The middle frame 30 may serve as a housing that protects the rear face of the display panel 100.

The middle frame 30 may have a structure to accommodate therein the display panel 100 and additional components such as a battery disposed on the back face of the display panel 100 to supply power to the display apparatus 1. The structure of the middle frame 30 is not particularly limited.

For example, the middle frame 30 may have a structure in which the middle frame covers the back face of the display panel 100 so that the display panel 100 may be housed in one portion of the middle frame 30, and an additional component, such as a battery, may be disposed under the middle frame 30.

Further, the middle frame 30 may be formed to cover a portion of the back face of the display panel 100. The display panel 100 may be housed in the middle frame 30 and additional components, such as batteries, are disposed under the middle frame 30 such that the display panel 100 and the additional components are in contact with each other.

One end of the middle frame 30 and the other end of the middle frame 30 may be fixed to the cover member 20 and the conductive member 330, respectively, by glue.

In this way, the conductive member 330 according to an example embodiment of the present disclosure may serve as a fastening structure for the middle frame 30. Thus, a separate fastening structure for the middle frame 30 in the display apparatus 1 may be omitted.

FIGS. 8A to 8D illustrate a manufacturing process of a cushion plate according to an example embodiment of the present disclosure.

A method for manufacturing the cushion plate 300 according to an example embodiment of the present disclosure may include forming the porous member 320 including the conductive metal 321 and the plurality of pores 323 positioned inside the conductive metal 321, first compressing the porous member 320, and second compressing the porous member 320 while laminating the first compressed porous member 320 to the first adhesive member 310.

Figure 8A:
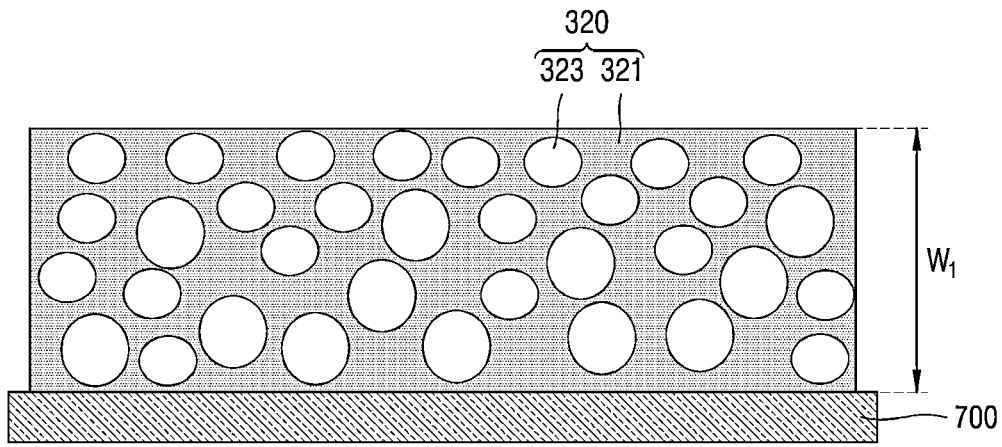
FIGS. 8A to 8D illustrate a manufacturing process of a cushion plate according to an example embodiment of the present disclosure.

As illustrated in FIG. 8A, a metal foam precursor including metal powders is sintered on a stage 700 to form the porous member 320 including the conductive metal 321 and the plurality of pores 323 positioned inside the conductive metal 321.

In this case, the thickness of the porous member 320 may be a first thickness $W_1$. The plurality of pores 323 included in the porous member 320 may be in a state before being compressed.

Figure 8B:
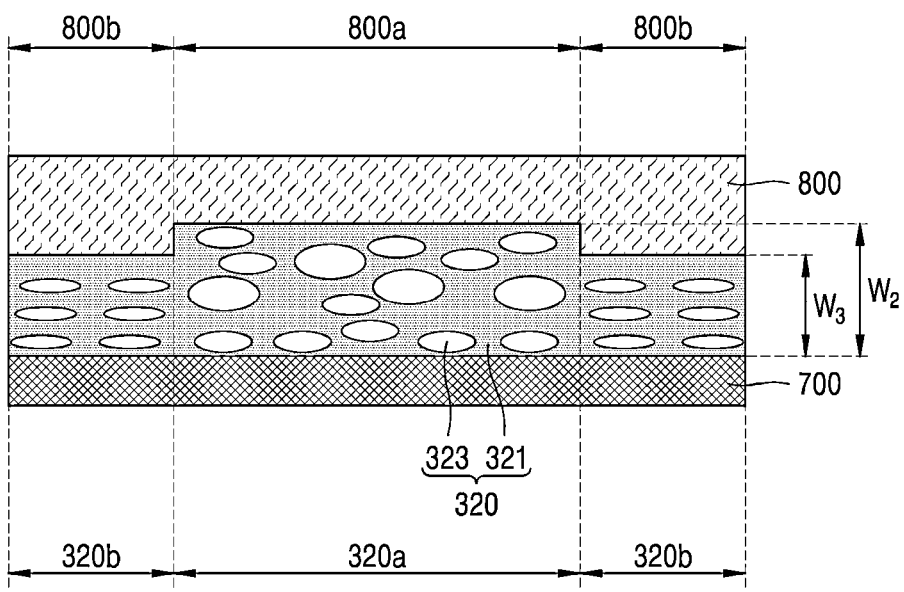

Next, as illustrated in FIG. 8B, the porosity of the porous member 320 may be reduced by first compressing the porous member 320.

For example, the porous member 320 may be compressed using a compressing unit 800 such as a press.

In this case, the compressing unit 800 for compressing the porous member 320 including the body portion area 320a and the side portion area 320b disposed along the side face of the body portion area 320a may include a first pressing portion 800a corresponding to the body portion area 320a of the porous member 320 and a second pressing portion 800b corresponding to the side portion area 320b.

Accordingly, the second pressing portion 800b of the compressing unit 800 may protrude downwardly beyond the first pressing portion 800a.

Since the second pressing portion 800b protrude downwardly beyond the first pressing portion 800a, the pressure applied to the side portion area 320b may be greater than the pressure applied to the body portion area 320a in an embodiment in which the porous member 320 is first compressed with the compressing unit 800.

Accordingly, the thickness of the side portion area 320b of the porous member 320 may be smaller than the thickness of the body portion area 320a.

For example, the thickness of the body portion area 320a may be reduced to the second thickness $W_2$, which is smaller than the first thickness $W_1$, which is the thickness of the body portion area 320a before the compression. The thickness of the side portion area 320b may be reduced to the third thickness $W_3$, which may be significantly smaller than the first thickness $W_1$, which is the thickness of the body portion area 320a before the compression.

In an example, the first thickness $W_1$ is about 70 μm, the second thickness $W_2$ may be about 50 μm, and the third thickness $W_3$ may be about 45 μm.

Since the thickness of the side portion area 320b is smaller than the thickness of the body portion area 320a, the porosity of the side portion area 320b may be lower than the porosity of the body portion area 320a.

In an experimental example, when the porosity of the porous member 320 before the compression was about 74%, the porosity of the body portion area 320a after the first compression may be reduced to about 60%, and the porosity of the side portion area 320b may be reduced to about 54%.

As used herein, the porosity may be defined as a ratio of an area occupied by the pores (e.g., pore 323) to a total area occupied by the pores and the conductive metal 321.

In this way, the thickness of the side portion area 320b of the porous member 320 included in the cushion plate is smaller than the thickness of the body portion area 320a. The porosity of the side portion area 320b is lower than the porosity of the body portion area 320a. Thus, the resulting cushion plate 300 may have improved push stiffness not only in the body portion but also in the side edge portion while having a reduced thickness.

Figure 8C:
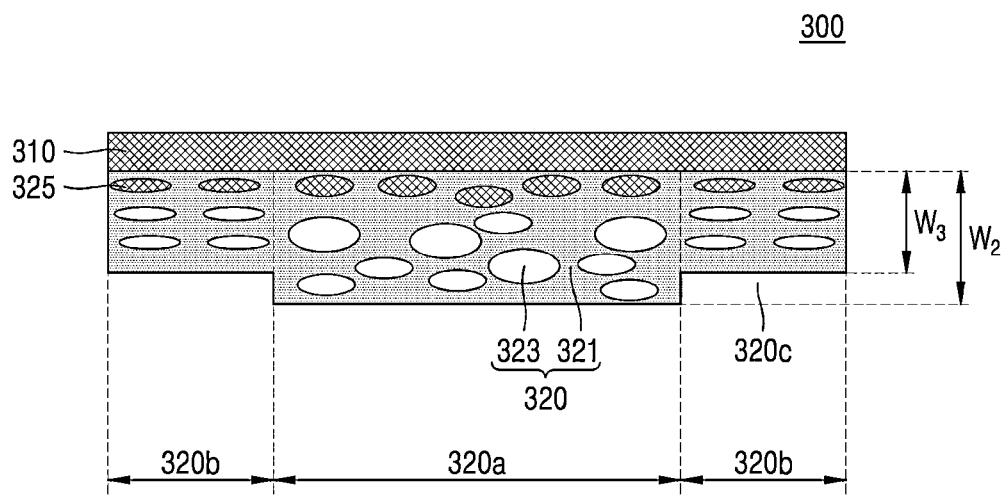

Next, as illustrated in FIG. 8C, the first compressed porous member 320 may be secondarily compressed while laminating the first compressed porous member 320 to the first adhesive member 310.

For example, in the second compression of the porous member 320, a predetermined pressure may be applied to the stack of the first adhesive member 310 and the porous member 320 such that the adhesive material of the first adhesive member 310 may fill the pores 323 of the porous member 320.

Accordingly, the pore 323 of the porous member 320 adjacent to the first adhesive member 310 may become the filled pore 325 filled with the adhesive material.

In this way, in the method for manufacturing the cushion plate 300 according to an example embodiment of the present disclosure, the second compression is performed so that the adhesive material of the first adhesive member 310 fills some of the plurality of pores 323. Thus, the thickness of the cushion plate 300 may be reduced by reducing the thickness of the first adhesive member 310. Further, as the porosity is reduced, further improved push stiffness may be obtained.

Figure 8D:
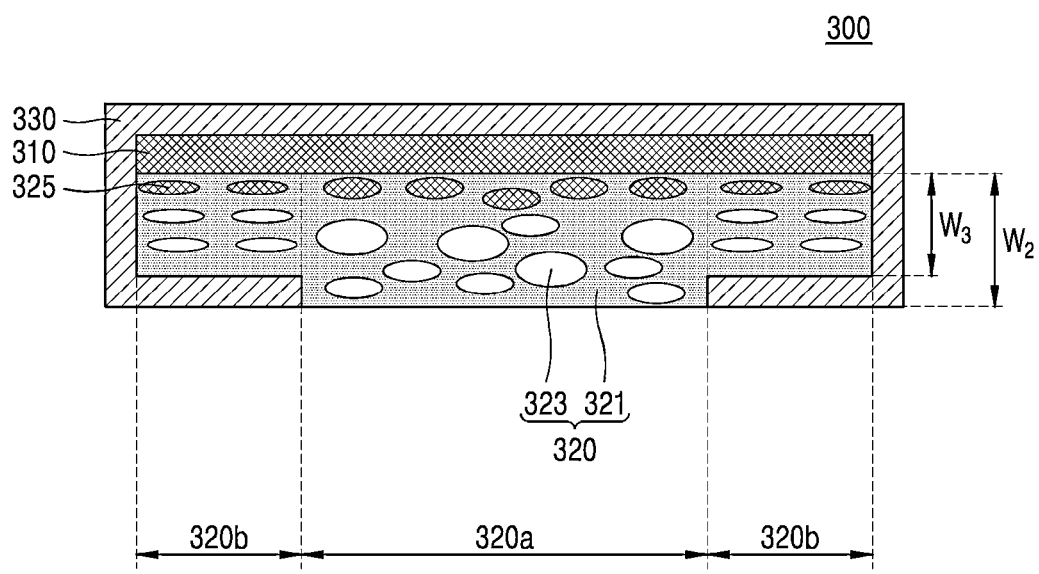

Next, as illustrated in FIG. 8D, the conductive member 330 may be formed to surround the first adhesive member 310 and the side portion area 320b of the porous member 320.

The conductive member 330 may include a material with high thermal conductivity, such that the heat-dissipation effect of the cushion plate 300 may be improved.

Further, since the conductive member 330 is formed to surround the first adhesive member 310 and the side portion area 320b of the porous member 320, the push stiffness of the cushion plate 300 including the side portion area 320b may be further improved.

In this way, according to an example embodiment of the present disclosure, after the porous member 320 is first compressed, the porosity of the porous member 320 can be further reduced by a second compression while laminating the first compressed porous member 320 to the first adhesive member 310. Thus, the cushion plate 300 having improved impact stiffness and push stiffness and at the same time, having a slimmer thickness may be manufactured.

FIGS. 9A to 9D are micrographs showing a difference between thicknesses of a porous member before and after compressing the porous member.

Figure 9A:
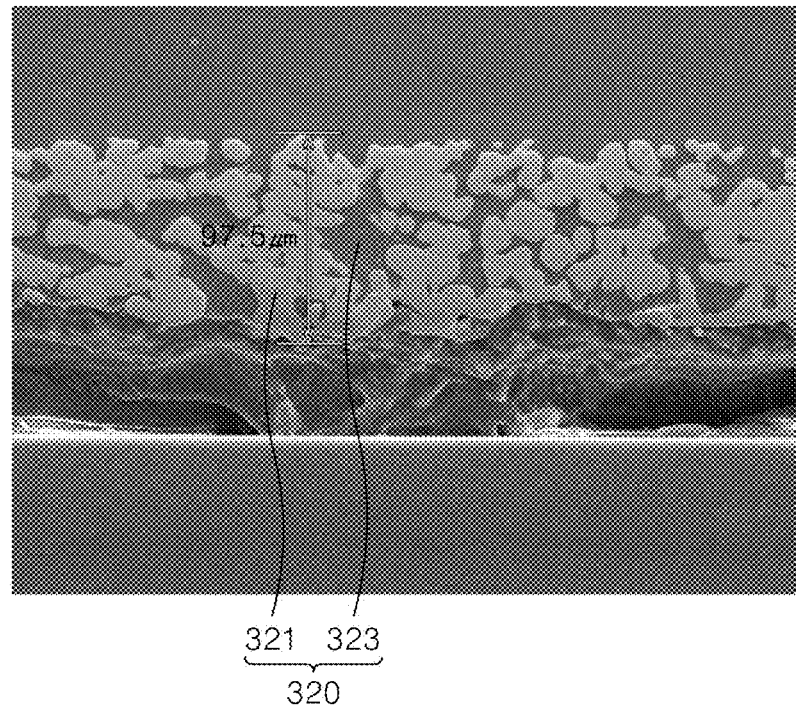
FIGS. 9A to 9D are micrographs showing a difference between thicknesses of a porous member before and after compressing the porous member.
Figure 9B:
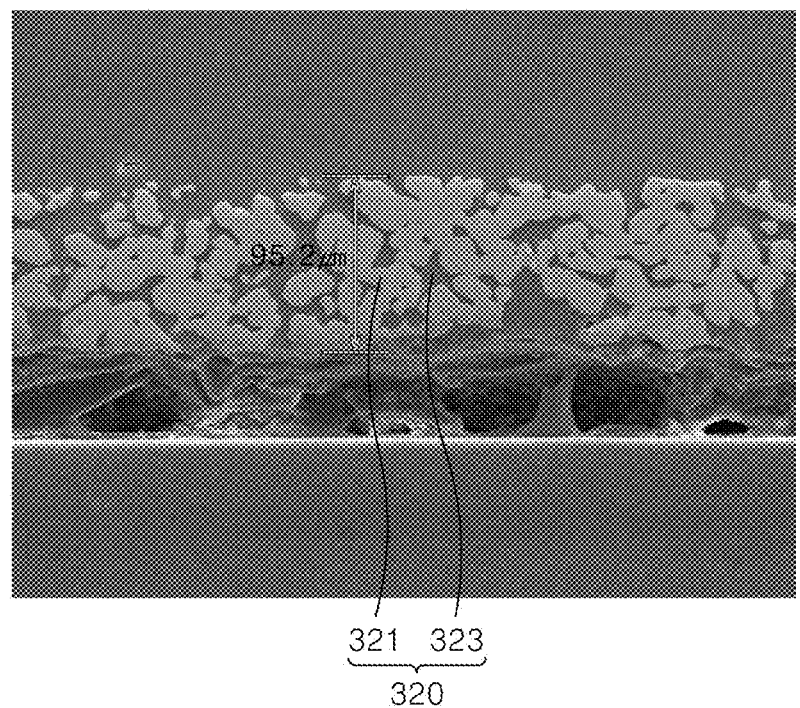
Figure 9C:
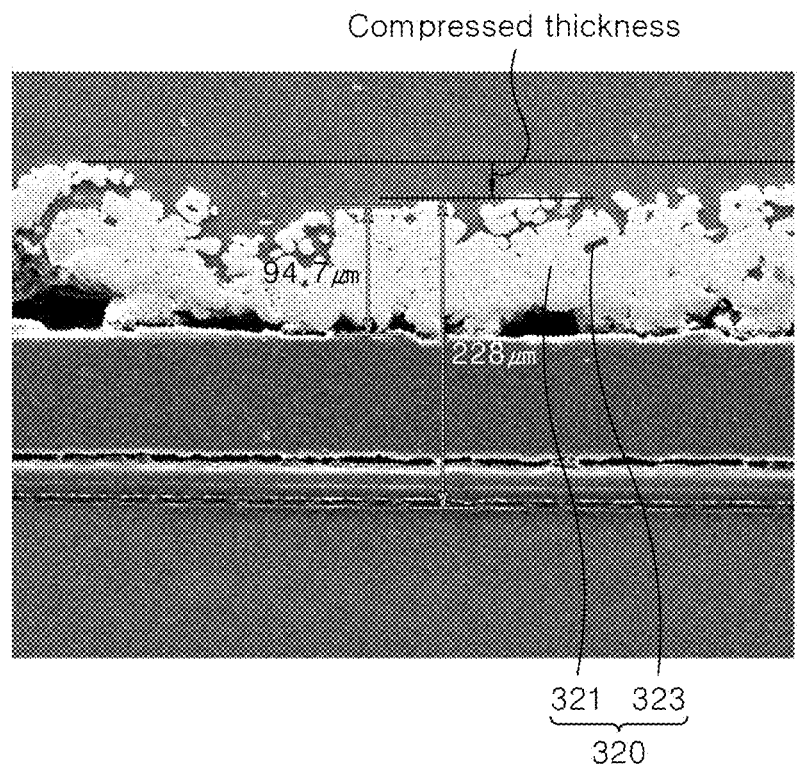
Figure 9D:
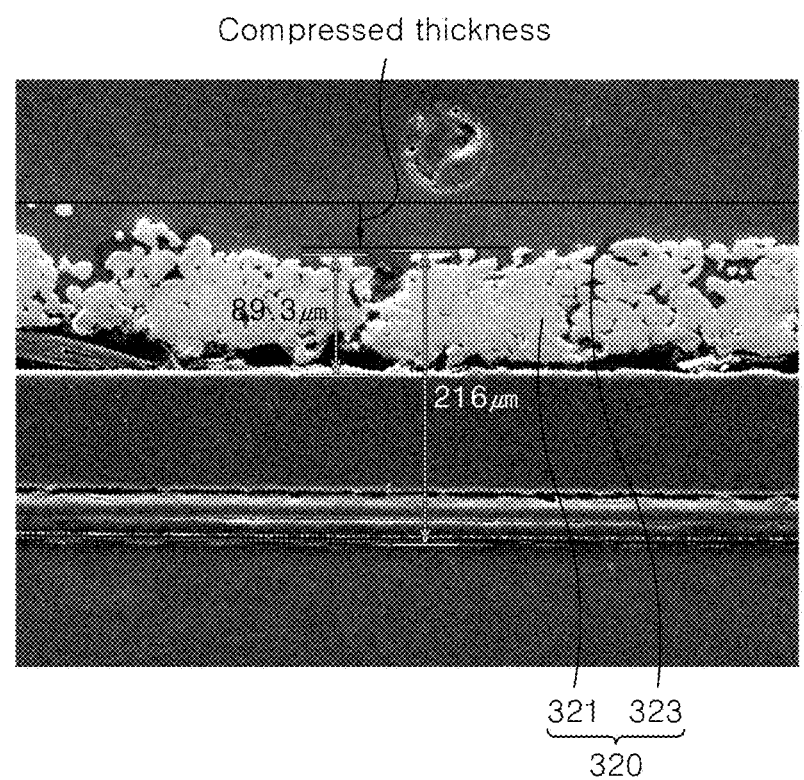

For example, FIG. 9A and FIG. 9B are micrographs of experimental examples before the porous member 320 is compressed. FIG. 9C and FIG. 9D are micrographs of experimental examples after the porous member 320 has been compressed.

As illustrated in FIG. 9A to FIG. 9D, in comparing the state of the porous member 320 before and after compression of the porous member 320, it may be observed that after the compression, the number and size of the pores 323 of the porous member are greatly reduced as much as the compressed thickness. Thus, the conductive metal 321 becomes denser.

Example embodiments of the present disclosure can also be described as follows:

A display apparatus according to example embodiments of the present disclosure may include a display panel to display an image, and a cushion plate disposed under the display panel. The cushion plate may have an adhesive member, and a porous member that may have a body portion area and a side portion area disposed along a side face of the body portion area. A thickness of the side portion area may be smaller than a thickness of the body portion area. A porosity of the side portion area may be lower than a porosity of the body portion area.

In some example embodiments, the porous member may include a conductive metal and a plurality of pores disposed inside the conductive metal.

In some example embodiments, at least a portion of the adhesive member may be present in at least some of the plurality of pores.

In some example embodiments, the porous member may include a metal foam.

In some example embodiments, the thickness of the side portion area may decrease from an inner side of the side portion area to an outer side of the side portion area.

In some example embodiments, the side portion area may have a constant thickness from an inner side of the side portion area to an outer side of the side portion area.

In some example embodiments, the porous member may further include a step area located directly below the side portion area. The step area may have a thickness corresponding to a difference between the thicknesses of the body portion area and the side portion area.

In some example embodiments, the cushion plate may further include a conductive member surrounding the adhesive member and at least a portion of the porous member.

In some example embodiments, the conductive member may surround the adhesive member and the side portion area.

In some example embodiments, the display apparatus may further include a cover member disposed on a top face of the display panel, and a middle frame disposed under the cushion plate. One end of the middle frame may be fixed to the cover member, and the other end of the middle frame may be fixed to the conductive member.

A cushion plate according to example embodiments of the present disclosure may include an adhesive member, and a porous member disposed on the adhesive member. The porous member may include a conductive metal and a plurality of pores disposed inside the conductive metal. The porous member may have a body portion area and a side portion area disposed along a side face of the body portion area. A thickness of the side portion area may be smaller than a thickness of the body portion area. A porosity of the side portion area is lower than a porosity of the body portion area.

In some example embodiments, at least a portion of the adhesive member may be present in at least some of the plurality of pores of the porous member.

In some example embodiments, the porous member may include a metal foam.

In some example embodiments, the thickness of the side portion area may decrease from an inner side of the side portion area to an outer side of the side portion area.

In some example embodiments, the cushion plate may further include a conductive member surrounding the adhesive member and the side portion area.

A method for manufacturing a cushion plate according to example embodiments in the present disclosure may include forming a porous member including a conductive metal, and a plurality of pores disposed inside the conductive metal, first compressing the porous member to form a first compressed porous member, and second compressing the first compressed porous member while laminating the first compressed porous member to an adhesive member.

In some example embodiments, the porous member may include a body portion area and a side portion area disposed along a side face of the body portion area. The first compressing of the porous member may include compressing the porous member using a compressing unit. The compressing unit may include a first pressing portion corresponding to the body portion area and a second pressing portion corresponding to the side portion area. The second pressing portion may protrude vertically and downwardly beyond the first pressing portion.

In some example embodiments, the first compressing of the porous member may be performed such that a pressure applied to the side portion area may be greater than a pressure applied to the body portion area.

In some example embodiments, the second compressing of the first compressed porous member may be performed such that at least a portion of the adhesive member may be compressed while laminating the first compressed porous member to the adhesive member so as to fill at least some of the plurality of pores of the first compressed porous member.

In some example embodiments, a thickness of the side portion area of the first compressed porous member may be smaller than a thickness of the body portion area of the first compressed porous member. A porosity of the side portion area of the first compressed porous member may be lower than a porosity of the body portion area of the first compressed porous member.

Although the example embodiments of the present disclosure have been described above in more detail with reference to the accompanying drawings, the present disclosure is not necessarily limited to the example embodiments, and various modifications may be made within the scope that does not deviate from the technical spirit or scope of the present disclosure. Therefore, the example embodiments as disclosed in the present disclosure are to illustrate the disclosure rather than limiting the technical idea of the present disclosure, and the scope of the technical idea of the present disclosure is not limited to the example embodiments. Therefore, it should be understood that the example embodiments as described above are illustrative in all respects and not restrictive. The protective scope of the present disclosure should be interpreted based on claims and their equivalents, and all technical ideas within the scope equivalent thereto should be construed as being included in the scope of the present disclosure.

What is claimed is:

1. A display apparatus, comprising:
   a display panel to display an image; and
   a cushion plate disposed under the display panel, the cushion plate having:
      an adhesive member, and
      a porous member including a body portion area and a side portion area disposed along a side face of the body portion area,
   wherein a thickness of the side portion area is smaller than a thickness of the body portion area, and
   wherein a porosity of the side portion area is lower than a porosity of the body portion area.

2. The display apparatus of claim 1, wherein the porous member includes a conductive metal and a plurality of pores disposed inside the conductive metal.

3. The display apparatus of claim 2, wherein at least a portion of the adhesive member is present in at least some of the plurality of pores.

4. The display apparatus of claim 2, wherein the porous member includes a metal foam.

5. The display apparatus of claim 4, wherein the thickness of the side portion area decreases from an inner side of the side portion area to an outer side of the side portion area.

6. The display apparatus of claim 4, wherein the side portion area has a constant thickness from an inner side of the side portion area to an outer side of the side portion area.

7. The display apparatus of claim 4, wherein the porous member further includes a step area located directly below the side portion area and having a thickness corresponding to a difference between the thicknesses of the body portion area and the side portion area.

8. The display apparatus of claim 4, wherein the cushion plate further includes a conductive member surrounding the adhesive member and at least a portion of the porous member.

9. The display apparatus of claim 8, wherein the conductive member surrounds the adhesive member and the side portion area.

10. The display apparatus of claim 9, further comprising:
    a cover member disposed on a top face of the display panel; and
    a middle frame disposed under the cushion plate,
    wherein one end of the middle frame is fixed to the cover member, and
    wherein the other end of the middle frame is fixed to the conductive member.

11. A cushion plate, comprising:
    an adhesive member; and
    a porous member disposed on the adhesive member, the porous member:
       including a conductive metal and a plurality of pores disposed inside the conductive metal, and
       having a body portion area and a side portion area disposed along a side face of the body portion area,
    wherein a thickness of the side portion area is smaller than a thickness of the body portion area, and
    wherein a porosity of the side portion area is lower than a porosity of the body portion area.

12. The cushion plate of claim 11, wherein at least a portion of the adhesive member is present in at least some of the plurality of pores of the porous member.

13. The cushion plate of claim 11, wherein the porous member includes a metal foam.

14. The cushion plate of claim 13, wherein the thickness of the side portion area decreases from an inner side of the side portion area to an outer side of the side portion area.

15. The cushion plate of claim 13, wherein the cushion plate further includes a conductive member surrounding the adhesive member and the side portion area.

* * * * *